United States Patent [19]

Numata et al.

[11] 4,152,058
[45] May 1, 1979

[54] SINGLE LENS REFLEX CAMERA

[75] Inventors: Saburo Numata; Shinichiro Okazaki, both of Urawa, Japan

[73] Assignee: Fuji Photo Optical Co. Ltd., Omiya, Japan

[21] Appl. No.: 779,510

[22] Filed: Mar. 21, 1977

[30] Foreign Application Priority Data

Mar. 22, 1976 [JP] Japan .................................. 51-31116

[51] Int. Cl.² ........................ G03B 19/12; G03B 9/64
[52] U.S. Cl. ..................................... 354/152; 354/238
[58] Field of Search .............. 354/156, 237, 238, 240,
354/258, 170, 171, 173, 152, 153

[56] References Cited

U.S. PATENT DOCUMENTS

| 3,442,192 | 5/1969 | Sato | 354/156 |
| 3,640,201 | 2/1972 | Kimura | 354/238 |
| 3,675,557 | 7/1972 | Yokozato et al. | 354/153 |
| 3,812,512 | 5/1974 | Shimizu et al. | 354/258 |
| 3,906,519 | 9/1975 | Ueda et al. | 354/156 X |

Primary Examiner—L. T. Hix
Assistant Examiner—William B. Perkey

[57] ABSTRACT

A single lens reflex camera provided with a swing-up mirror which is held in the retracted position while pictures are successively taken. A delay circuit is connected between a shutter release signal generator and a leading shutter blind driving circuit for delaying the transmission of the shutter release signal to the leading shutter blind driving circuit when pictures are normally taken. The delay circuit has a switch which selectively makes the delay circuit functions to delay the signal transmission or nullifies the delay circuit to transmit the signal without delay. The switch is connected with the swing-up mirror to nullify the delay circuit when the swing-up mirror is held in the retracted position to conduct the successive photographing.

5 Claims, 2 Drawing Figures

SINGLE LENS REFLEX CAMERA

BACKGROUND OF THE INVENTION

1. Field of the Invention

This invention relates to a single lens reflex camera, and more particularly to a single lens reflex camera provided with means for successively taking pictures while holding a swing-up mirror in the upper retracted position. The present invention is specifically concerned with a single lens reflex camera provided with a delay circuit which causes an electric shutter release signal to a shutter control circuit to be delayed.

2. Description of the Prior Art

A single lens reflex camera has a swing-up mirror which is retracted from the optical path in the camera body when the shutter is caused to be released by depression of a shutter release button to expose the film loaded therein to the light passing through the taking lens. When the shutter release button of the camera is depressed, the diaphragm aperture is stopped down to the preselected size from the fully open position and the swing-up mirror is retracted upward from the position to reflect the light from the taking lens to a focusing plate and then the leading shutter blind is started to expose the film. In order to assure that the exposure initiated by the start of the leading shutter blind begins after the swing-up mirror is completely swung up to the retracted position, it is known in the art to produce a shutter release signal by use of a mechanical member used to swing up the mirror.

In the above described single lens reflex camera, there is a defect in that the mechanical delay means cannot be removed even when pictures are successively taken. Therefore, it is impossible or very difficult to conduct the successive photographing at a high speed.

In order to solve the above problem, it has been known in the art to provide means to hold the swing-up mirror in its upper retracted position while the pictures are successively taken. In this case, however, the speed is still desired to be increased further.

SUMMARY OF THE INVENTION

It is the primary object of the present invention to provide a single lens reflex camera which is capable of successively taking pictures at a high speed.

Another object of the present invention is to provide a single lens reflex camera wherein a swing-up mirror is held in its retracted position and the shutter release mechanism is operated without a delay by a shutter release signal when pictures are successively taken.

The single lens reflex camera is characterized in that the conventional mechanical delay means is replaced by an electric delay circuit interposed between a shutter release signal and a leading shutter blind driving means, and that the electric delay circuit is nullified when the pictures are taken successively. In one embodiment of the present invention, the circuit is of analogue type and in the other it is of digital type. Since the delay circuit is nullified when the mirror is swung up to successively taken pictures, the successive photographing is conducted at a high speed. Further, since the delay means is composed of an electric circuit, the camera in accordance with this invention can be made compact in size.

DESCRIPTION OF THE PREFERRED EMBODIMENTS

Figure 1:
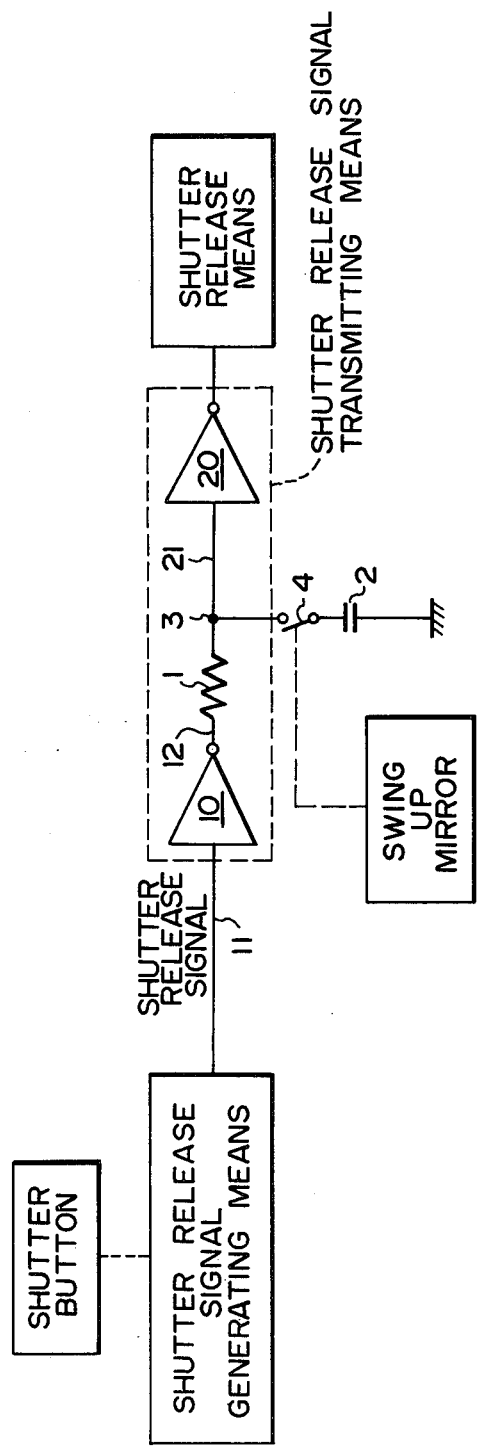
FIG. 1 is a circuit view showing a delay circuit employed in one embodiment of the present invention wherein the circuit is of analogue type.

Referring to FIG. 1 which shows an analogue type delay circuit employed in an embodiment of the single lens reflex camera in accordance with the present invention, a shutter release signal which is generated upon depression of a shutter release button of the camera is put into the input 11 of a first inverter 10, and an exposure start signal for starting a leading shutter blind (not shown) of the camera is obtained at the output 22 of a second inverter 20. Between the output 12 of the first inverter 10 and the input 21 of the second inverter 20 is connected a resistor 1. A capacitor 2 grounded is connected with a connecting point 3 between the resistor 1 and the input 21 of the second inverter 20 by way of a delay switch 4. When the delay switch 4 is closed, a delay circuit is constituted of the resistor 1 and the capacitor 2. When the delay switch 4 is opened, the resistor 1 acts as an input protecting resistor for the second inverter 20.

In operation of the above described embodiment of the invention, when said delay switch 4 is closed, upon input of the shutter release signal of low level (hereinafter referred to as L-level) into the input 11 of the first inverter 10, the output of the inverter 10 is converted into high level (hereinafter referred to as H-level). However, until the current flowing through the resistor 1 is charged up in the capacitor 2 and the charged voltage of the capacitor 2 becomes higher than the threshold level of the input of the second inverter 20, the output of the second inverter 20 does not convert to L-level. In other words, a delay circuit is consituted of the resistor 1 and the capacitor 2, and the time constant of the delay circuit is determined by the resistance of the resistor 1, the capacitance of the capacitor 2 and the threshold level of the input 21 of the second inverter 20. Therefore, by using the delay time of the delay circuit for the preparation of shutter release in which for instance a swing up mirror is swung up to the retracted position, the normal photographing can be conducted.

When said delay switch 4 is opened, the output of the second inverter 20 is converted to L-level immediately upon conversion of the output of the first inverter 10 to H-level in response to receipt thereby of the shutter release signal. Therefore, the leading shutter blind is started immediately upon generation of the shutter release signal. Therefore, when a successive photographing is desired, the delay switch is opened to nullify the delay circuit in response to swing up of the mirror in the camera.

The above described embodiment of the invention uses a delay circuit of analogue type. The present invention can be embodied in a digital type circuit. An example of a delay circuit of digital type which can be used in the present invention will now be described with reference to FIG. 2. A shutter release signal as used in the first embodiment and clock pulses are put into the input terminals of a NAND circuit 30 the output of which is connected to a trigger terminal T1 of a first flip-flop F1. Four flip-flops F1, F2, F3 and F4 are connected in series to constitute a T-flip-flop circuit. The number of the flip-flops is not limited to four, but may be properly selected according to the delay time desired.

The output $\overline{Q1}$ of the first flip-flop F1 is connected to one input of a second NAND circuit 40. To the other input of the second NAND circuit 40 is connected the make contanct m of a delay switch 5 the common contanct of which is grounded. The output $\overline{Q4}$ of the fourth flip-flop F4 is connected to one input of a third NAND circuit 50. To the other input of the third NAND circuit 50 is connected the break contact b of the delay switch 5. The outputs of the second and third NAND circuits 40 and 50 are connected to the two inputs of a NOR circuit 60 the output of which is connected to a leading shutter blind drive means to give an exposure start signal thereto.

The operation of the above described second embodiment of the invention will be described hereinbelow. When the common contact of the delay switch 5 is in contact with the make contact m, upon input of the shutter release signal of L-level into the input of the first NAND circuit 30, the clock pulses are put into the trigger terminal T1 of the first flip-flop F1 and the output of the first flip-flop F1 generated from the output terminal Q1 is converted to L-level by the first one pulse of the clock pulses. Thus, the output of the second NAND circuit 40 is converted to H-level and the final output from the the NOR circuit 60 is converted to L-level to start the exposure without delay. In the above operation, it is assumed that all the flip-flops F1 to F4 are reset upon turning on of a power switch (not shown).

Figure 2:
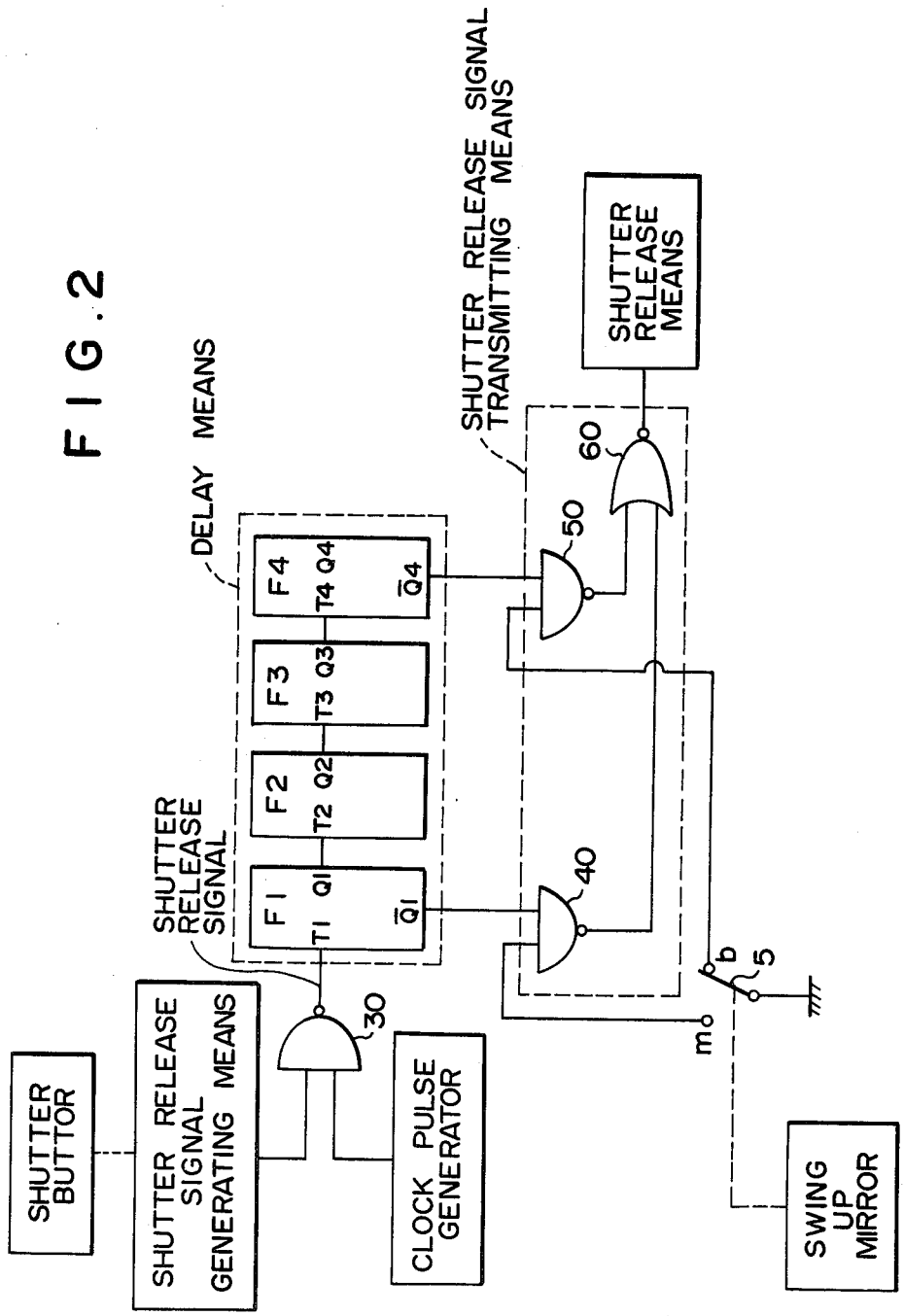
FIG. 2 is a circuit view showing a delay circuit employed in another embodiment of the present invention wherein the circuit is of digital type.

When the common contact is in contact with the break contact b as shown in FIG. 2, one input of the second NAND circuit 40 is not converted to L-level and accordingly the output thereof keeps to be in L-level. Therefore, the output of the NOR circuit 60 is not converted to L-level even when the output of the first flip-flop F1 at the output terminal Q1 is turned to L-level. On the other hand, the third NAND circuit 50 is energized since one input thereof is converted to L-level. Therefore, when the output of the fourth flip-flop F4 is turned to L-level after a delay time determined by the flip-flops F1 to F4 has passed since the first flip-flop F1 received the signal from the first NAND circuit, the output of the NAND circuit 50 is turned to H-level and accordingly the output of the NOR circuit 60 is turned to L-level. Thus, the transmission of the shutter release signal ot the shutter release means is delayed when the delay switch 5 is in the state as shown in FIG. 2.

Similarly to the foregoing first embodiment of the invention, the delay switch 5 is connected to a mirror swing up mechanism in the camera so that the common contact of the delay switch 5 is put into contanct with the make contact m when the mirror is held up in the retracted position for taking pictures successively.

We claim:

1. A single lens reflex camera which comprises a swing up mirror which is swung up to a retracted position when a shutter is released in the camera and is held in the retracted position while pictures are taken successively, means for generating a shutter release signal upon depression of a shutter button in the camera, means for transmitting said shutter release signal to a shutter release means in the camera to start exposure of a film loaded in the camera to light passing through the taking lens of the camera, and delay means connected with said signal transmitting means for delaying the transmission of said shutter release signal to said shutter release means characterized in that said delay means comprises an electric delay circuit including a switch which is capable of selectively making the delay circuit act as a delay circuit or nullifying the delay circuit to transmit the signal without delay, said switch is operatively connected with said swing up mirror, and said switch is put into its state to nullify said delay circuit when said swing up mirror is held in said retracted position for taking pictures while pictures are successively taken and is put into its state to make the delay circuit act as a delay circuit when said swing up mirror is in its not retracted position.

2. A single lens reflex camera as defined in claim 1 wherein said delay circuit includes a capacitor selectively connected to said signal transmitting means by way of said switch.

3. A single lens reflex camera as defined in claim 2 wherein said signal transmitting means includes a resistor connected between said shutter release signal generating means and said shutter release means, and said capacitor is connected between one end of said resistor and the ground.

4. A single lens reflex camera as defined in claim 1 wherein said delay circuit comprises a series of flip-flops connected with said shutter release signal generating means, a first gate means connected with the output of a first step flip-flop of said series of flip-flops, a second gate means connected with the output of the last step of said series of flip-flops, a third gate means connected between said shutter release means and the outputs of said first and second gate means for transmitting the shutter release signal therethrough when one of said gate means is turned on, and said switch connected with the inputs of said first and second gate means for selectively turning on one of said gate means.

5. A single lens reflex camera as defined in claim 4 wherein said said series of flip-flops are connected at the input of the first step flip-flop thereof with the output of a NAND circuit the two inputs of which are connected with said shutter release signal generating means and a clock pulse generating means respectively, and said first and second gate means are NAND circuits one of the two inputs of both of which is connected with said switch, and said third gate means is a NOR circuit having two inputs connected with the outputs of said NAND circuits.

* * * * *